PLURAL SIGNAL FREQUENCY DETECTOR ABLE TO CONTINUOUSLY DISTINGUISH WHETHER FREQUENCY DIFFERENCE IS POSITIVE OR NEGATIVE

Filed March 29, 1961 6 Sheets-Sheet 1

Inventor
Herbert Ernyei
By Konrad Flocks
Attorney

Inventor
Herbert Ernyei
By Karl W. Flocks

June 4, 1963 H. H. ERNYEI 3,092,736

PLURAL SIGNAL FREQUENCY DETECTOR ABLE TO CONTINUOUSLY DISTINGUISH WHETHER FREQUENCY DIFFERENCE IS POSITIVE OR NEGATIVE

Filed March 29, 1961 6 Sheets-Sheet 3

Inventor
Herbert Ernyei
By
[illegible]
Attorney

Inventor
Herbert Ernyei
By
[signature]
Attorney

June 4, 1963 H. H. ERNYEI 3,092,736

PLURAL SIGNAL FREQUENCY DETECTOR ABLE TO CONTINUOUSLY DISTINGUISH WHETHER FREQUENCY DIFFERENCE IS POSITIVE OR NEGATIVE

Filed March 29, 1961 6 Sheets-Sheet 5

Inventor
Herbert Ernyei
By [signature]
Attorney

June 4, 1963 H. H. ERNYEI 3,092,736

PLURAL SIGNAL FREQUENCY DETECTOR ABLE TO CONTINUOUSLY DISTINGUISH WHETHER FREQUENCY DIFFERENCE IS POSITIVE OR NEGATIVE

Filed March 29, 1961 6 Sheets-Sheet 6

Inventor
Herbert Ernyei
By
[signature]

United States Patent Office 3,092,736

Patented June 4, 1963

3,092,736

PLURAL SIGNAL FREQUENCY DETECTOR ABLE TO CONTINUOUSLY DISTINGUISH WHETHER FREQUENCY DIFFERENCE IS POSITIVE OR NEGATIVE

Herbert H. Ernyei, Paris, France, assignor to Lignes Telegraphiques et Telephoniques, Paris, France, a joint-stock company of France Filed Mar. 29, 1961, Ser. No. 99,278
Claims priority, application France Mar. 30, 1960
9 Claims. (Cl. 307—88.5)

The present invention relates to circuitry adapted to enable the determination to be made, in a continuous manner, of the sign of a difference between two quantities represented by the frequencies of two continuous waves, that is to say making it possible to distinguish whether a difference in frequency is positive or negative. A large number of circuits have already been proposed which are adapted to define the difference between two frequencies $f_1$ and $f_2$ respectively. Many of these circuits are not designed so as to determine the sign of that difference, but only its absolute value. This digital measurement of the difference would not be sufficient for all applications, particularly in the cases where the difference to be determined corresponds to the measurement of the error in an automatic control system. In these cases, the difference may, in fact, vary abruptly, not only in absolute value but also in sign, and this may happen in an entirely unpredictable manner. There also exist other fields of utilization in which it is necessary to determine the "algebraic" value of a difference, that of calculating machines in particular.

The circuitry forming the subject matter of the present invention utilizes solely filters formed by passive components and binary circuits, the operation of which is independent of the characteristics, or of the aging of the various components.

The determination of the sign of the difference between the frequencies is based on modulating the frequency of one of the continuous waves with an auxiliary signal, and feeding said two continuous waves to a phase sensitive circuit and comparing the phase of the auxiliary signal frequency output from said phase sensitive circuit with the instantaneous phase of said auxiliary signal, said comparison being carried out at instants determined by the beat frequency output component from said phase sensitive circuit at a repetition frequency equal to the difference between the frequencies of said two continuous waves. This determination of the sign results in a signal of the binary type, that is to say having either of two possible values. The uses of the signal thus obtained are manifold. It may be utilized for control and/or calculation purposes; in this latter case, the arithmetical value of the difference between the frequencies is obtained by any method known per se, such as, for example, by supplying a binary counter with pulses whose recurrence frequency is equal to the difference to be measured, or by measuring the number of pulses delivered by a clock during a period of the said signal.

The method of determining the sign of the difference in frequency between two continuous waves, of which at least one can vary, is essentially based, according to the present invention, on the following points:

Periodic determination of the sign of the difference between the frequencies of the two continuous waves using an auxiliary signal to frequency modulate one of said waves, feeding said waves to a nonlinear circuit, using the beat frequency component from the phase detection of the two continuous waves, said periodic determination being effected at instants repeating at a repetition frequency equal to the difference between the frequencies of the two continuous waves.

The means for carrying out this method, according to the present invention, are essentially characterized by the following points taken in combination, wholly or in part:

(*a*) A phase-detector circuit supplying two filters, one at the beat frequency, the other being tuned at the frequency of the auxiliary signal.

(*b*) Two gate units of the "AND" type, separate or combined in a single circuit, to compare the phases of the signal from the second filter of (*a*) above, with the auxiliary signal.

(*c*) Two shaping circuits to receive, as input, the output from the beat frequency filter, and to shape said input into a control signal to operate the gates of (*b*) above.

(*d*) The said shaping circuits of (*c*) above comprise firstly a bi-stable circuit followed by a mono-stable circuit.

(*e*) The mono-stable circuit of (*d*) above is triggered by said bi-stable circuit after a fixed delay.

The invention will be more readily understood from the description which follows and the accompanying figures, given by way of illustration of the invention and not constituting in any sense a limitation on the scope of the latter.

FIGS. 2A, 2B, 3A and 3B enable the operation of the phase-detector to be fully understood.

Figure 1:
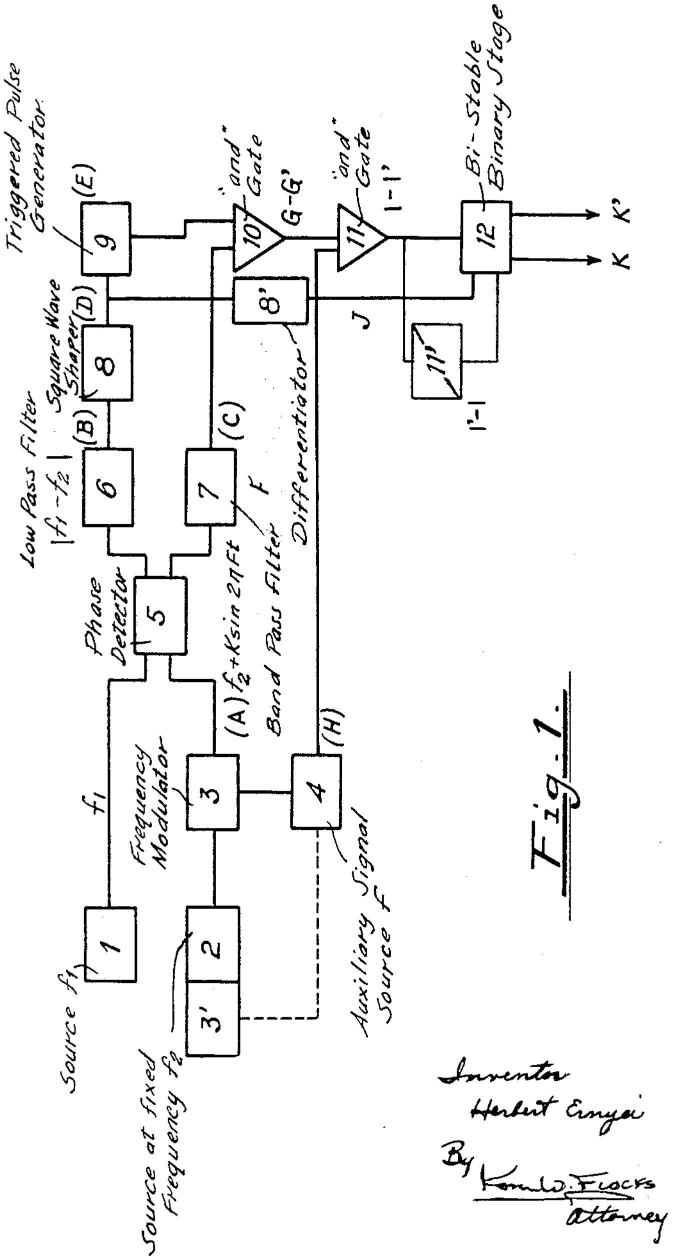
FIG. 1 represents a block diagram of the circuit according to the invention.
Figure 4:
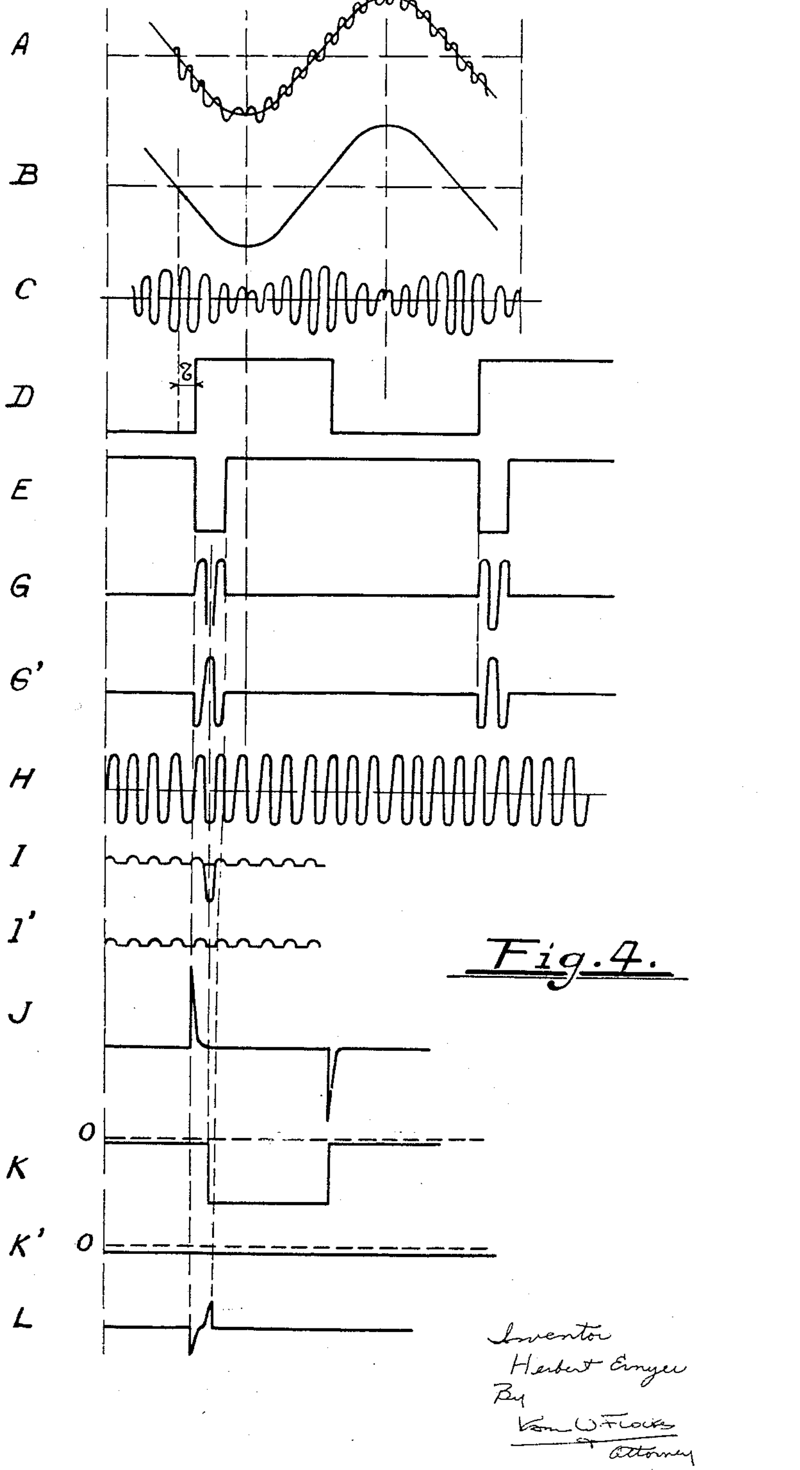

FIG. 4 represents the signals appearing at various points in the circuit of FIG. 1.

Figure 5:
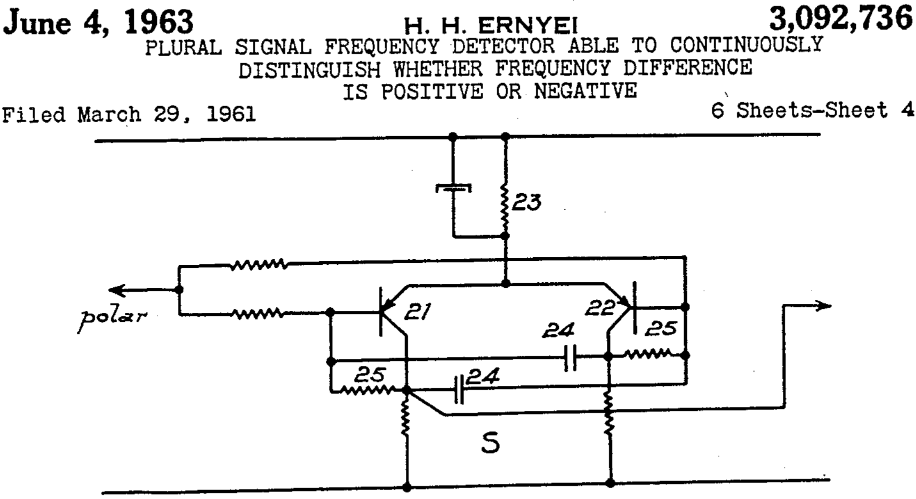
Figure 6:
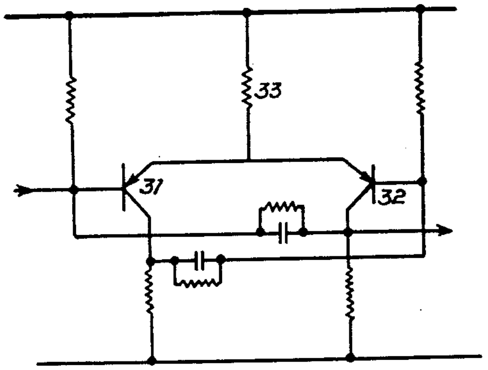

FIGS. 5 and 6 represent particular arrangements of elemental circuits used.

Figure 7:
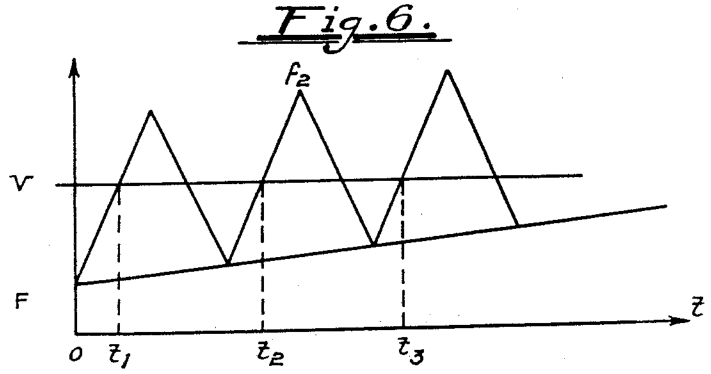

FIG. 7 illustrates diagrammatically a method of frequency modulating a continuous wave.

Figure 8:
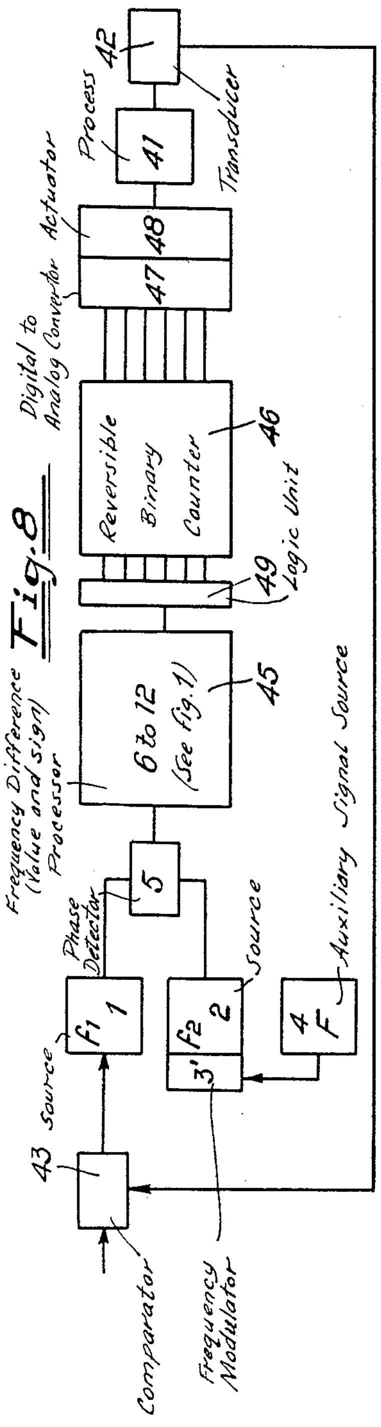
Figure 9:
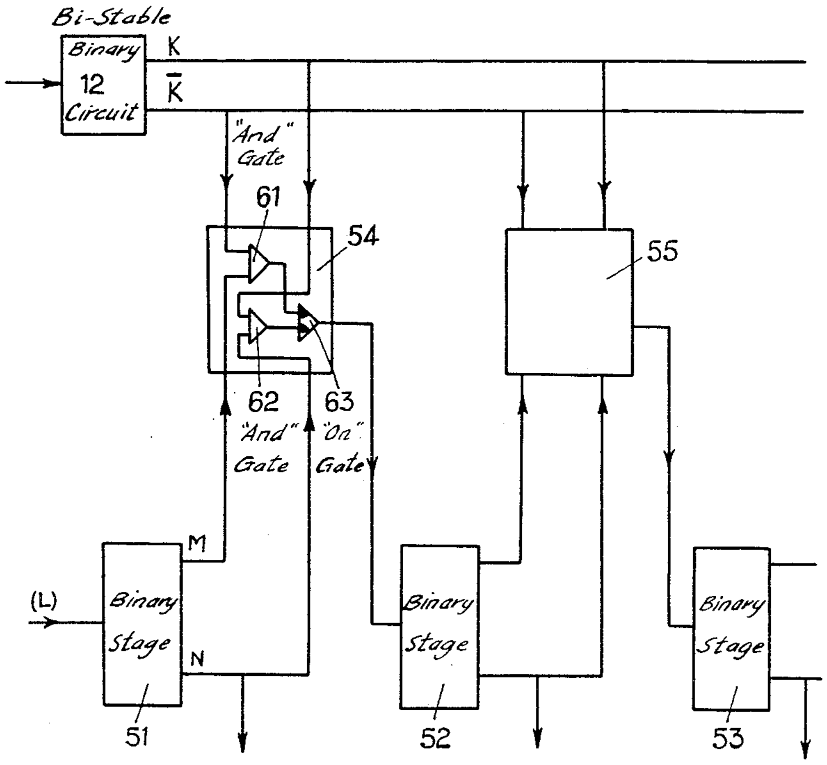

FIGS. 8 and 9 represent an application of the invention to an automatic control system.

Shown in FIG. 1 are the two sources, 1 and 2 respectively, of continuous waves responsible for the frequencies whose difference is to be determined both in magnitude and sign. By way of example it will be assumed that the frequency $f_1$ of the source 1 varies as a function of certain data and that the frequency $f_2$ of the source 2 is fixed. The circuits intended for the preparation of the signal which characterizes the sign will firstly be considered. Determining the difference $f_1-f_2$ necessitates modulating, either in frequency or in phase, one of the sources; it will be assumed, without any implied limitation, that it is the source 2 which is modulated. At 3 has been shown the modulator which also receives the modulation signal delivered by the source of auxiliary signals 4. The frequencies of the sources 1, 2 and 4 will be respectively designated $f_1$, $f_2$ and F.

In accordance with the above hypothesis, $f_1$ is variable. The signals delivered by the source 1 and the modulator 3 (frequencies $f_1$ and $f_2+K \sin Ft$) are fed to a phase-detector circuit with non-linear characteristics, shown at 5. This supplies two filtering circuits in parallel, a low-pass filter 6 designed to pass the component at frequency $(f_1-f_2)$ from the output of the detector 5, and a band-pass filter 7 tuned at frequency F. The output signal from the low-pass filter 6 triggers a square-wave shaper 8 through a pre-set delay element which introduces a lag. The square-wave signals thus obtained supply a generator 9 of pulses of duration slightly greater than $1/F$ sec. These pulses control the opening of a "AND" gate 10. The output from 10 is made of the part of the signal passed through 7 which occurs at the instants defined by the pulses from 9.

The phase of the output from 10 is compared with the phase of the auxiliary signal delivered by the generator 4, in a second "and" gate shown at 11. As will be explained later, these two signals are either in phase or out of phase, depending on the sign of the difference $f_1-f_2$ between the frequencies. The output signal from gate 11 will therefore have one out of two values. It is practically zero if the two signals are out of phase and reaches a certain amplitude when the two signals are in phase. There has thus been obtained a signal characterizing the sign of the difference $f_1-f_2$.

Subsequent use of the output signal from the circuit 11 can be of any nature, and does not fall within the scope of the present invention. By way of example of a complete range of use, there can be quoted here the circuits necessary for utilization of the said signal in an automatic control system.

The method of frequency modulation to be employed for sources 1 and 2 will be dealt with in detail later (cf. FIG. 7). The signal from the "AND" gate 11 is used to control a bi-stable binary stage 12 which delivers a D.C. signal whose amplitude remains constant as long as the amplitude of the pulses transmitted by 11 stays below a certain threshold value, that is to say when the signals transmitted by both 4 and 7 remain out of phase during the pulses delivered by 9. The binary stage gives out a D.C. signal whose amplitude has a second value which is as different as possible from that preceding when the amplitude of the wave trains transmitted by 11 is greater than said threshold value, that is to say when the signals from both 4 and 7 are in phase during the pulse from 9.

At the beginning of a measurement it is necessary to pre-set the operating conditions for the binary stage 12. This is controlled automatically by the signal from differentiator 8' fed by the square-wave output signal from the square wave shaper 8, which sets back the bistable stage 12 after operation. It is also possible, by means of an additional "AND" stage 11' to cause 12 to switch over only when the sign of the difference changes. There is thus obtained, at KK', a signal of the binary type which characterizes the sign of the difference in frequency between the sources 1 and 2.

Figure 1A:
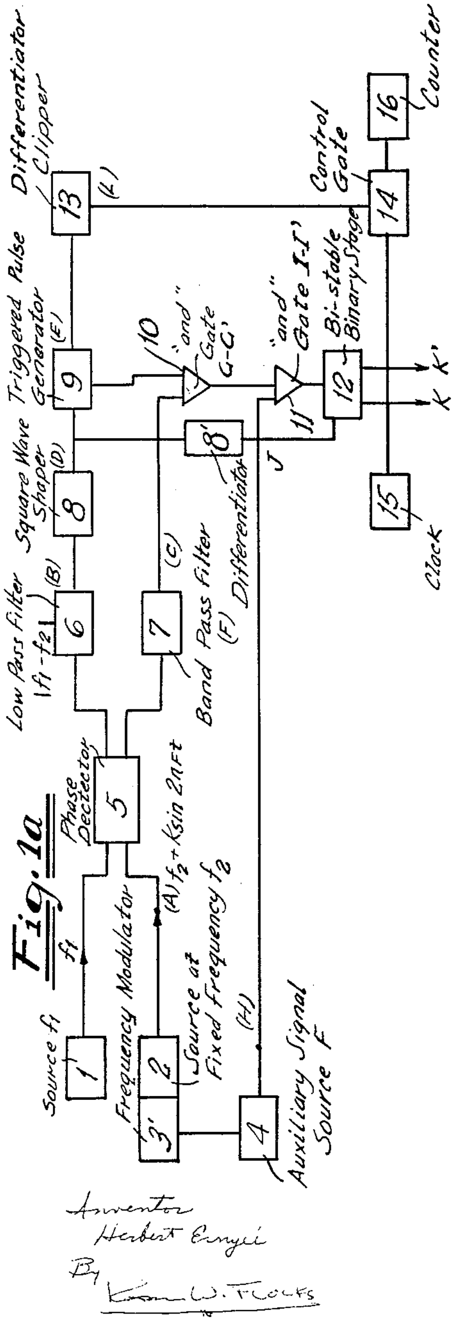
FIG. 1A represents a block diagram of a modified circuit according to the invention.

The circuits 13 to 16, shown in FIG. 1A, show an end embodiment of the circuit which has just been described in connection with FIG. 1 when it is desired to obtain a measurement of the difference $f_1-f_2$. The pulses delivered by the differentiator-clipper 13 have a repetition frequency equal to the arithmetical value of difference $f_1-f_2$. Differentiator 13 gives a negative going pip corresponding to the leading edge of the pulse from generator 9 and a positive going pip in registration with the other edge. The negative going pip is removed by the clipper and only the positive going pips are transmitted to control gate 14. It is only necessary to measure the interval of time which separates two consecutive pulses (the effect of the delay introduced in the triggering of 8 is thereby removed) to obtain the digital values $f_1-f_2$. The pulses from 13 control gate 14 placed between a counter 16 and a source of pulses to be counted or clock 15 at a high frequency with respect to the inverse of the maximum value of $f_1-f_2$. The counter 16 registers the difference in absolute value, the bistable stage 12 its sign.

Actually in automatic control systems the error signal is introduced into the control loop from a comparison circuit which supplies a signal, the frequency of which is a measurement of such error (source 1 at frequency $f_1$ of FIG. 1). For technical reasons, which will be readily apparent to those skilled in the art, and in particular because the error is an algebraic quantity, it is necessary to use a heterodyne system, the local oscillator of which is source 2 (wave at frequency $f_2$). Since source 2 belongs to the circuit it is easy to frequency modulate either by using a reactance tube generator or by any other method known per se. Such a generator is shown at 3' in FIG. 1A. The other circuits of FIG. 1A are identical with the circuits of FIG. 1 bearing the same reference numerals.

Figure 2A:
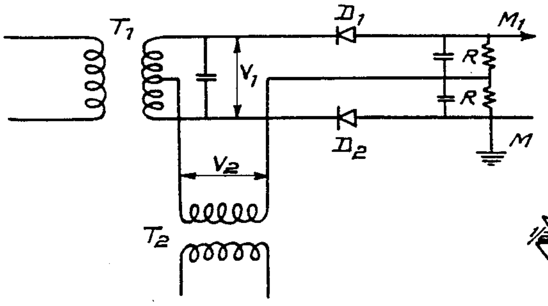
Figure 2B:
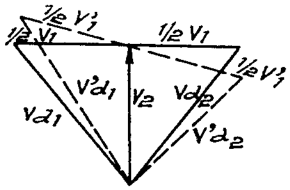

There is shown in FIG. 2A a known circuit diagram of a balanced phase-detector which can be used for example in an application of the invention, and in FIG. 2B a diagram of the operation of this circuit.

The signal at frequency $f_1$ is applied to the primary winding of transformer $T_1$ and produces a voltage $V_1$ at the secondary winding.

The signal at frequency $f_2$ is applied to the primary of the transformer $T_2$ and produces a voltage $V_2$. The diodes $D_1$ and $D_2$ detect the voltages $-\frac{1}{2}\vec{V}_1+\vec{V}_2$ and $+\frac{1}{2}\vec{V}_1+\vec{V}_2$. By reason of the symmetrical arrangement of the diodes, the currents in the load resistances R are equal and opposite in direction and the difference in potential between M and $M_1$ is zero in the case where the alternating voltages applied to both diodes have the same magnitude. This is the case (diagram in full lines) when $\vec{V}_1$ and $\vec{V}_2$ have a relative phase difference of 90° (see FIG. 2B). These conditions of operation are considered as the conditions of reference.

If the phase-difference between $\vec{V}_1$ and $\vec{V}_2$ increases in the positive direction (diagram in dotted lines), a potential difference appears between M and $M_1$, since the voltages $V'_{d1}$ and $V'_{d2}$ at the terminals of the diodes are different. If the relative phase-difference diminishes, the polarity of the potential difference is reversed. It can be shown (FIG. 3A) that the potential difference between M and $M_1$ varies in a sinusoidal manner. It has a slope of variation having a given sign if the phase-shift with respect to the initial conditions remains less than $\pm\pi/2$. When this value is reached the slope of variation of the detected voltage reverses, and so on.

Figure 3A:
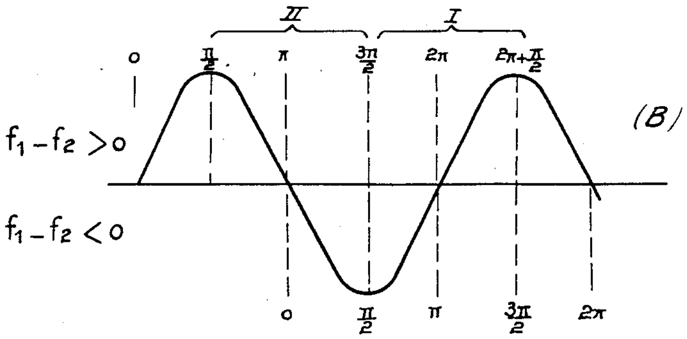
Figure 3B:
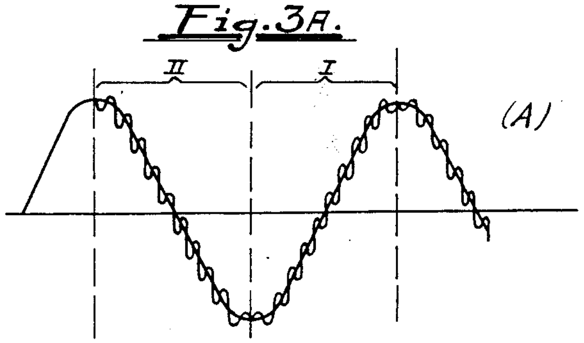

The curves of FIGS. 3A and 3B represent the output of the circuit, that is to say the output voltage delivered by this circuit as a function of the phase-shift between the input signals in the case where the input signals have fixed and different frequencies (FIG. 3A); the frequency (and therefore the phase) of one of the component signals varies in course of time (modulation—FIG. 3B).

Referring to FIG. 3A in more detail, it can be seen that the beat signal delivered by this type of circuit when the two input signals have fixed frequencies (phase-shift proportional to time) is a periodic function, the frequency of which is equal to the beat frequency of the two signals. If a given instant is chosen as the time origin, the difference in phase between two signals of fixed and different frequencies increases as a function of time. There will therefore be obtained an output signal which increases to a maximum value corresponding to a phase-shift (measured with respect to initial conditions as set out above) of $\pi/2$, then for phase-shifts between $\pi/2$ and $3\pi/2$, the slope of the signal reverses, the output signal becomes zero for a phase-shift of $\pi$, passes through a minimum for a phase-shift of $3\pi/2$ and again becomes zero for the phase-shift of $2\pi$, and the cycle recommences.

It will be recalled that the phase-differences which are referred to here are measured by taking as the origin the conditions for which the potential difference at the terminals $M-M_1$ is zero, that is to say a phase-difference at the origin between $V_1$ and $V_2$ of 90°.

It can be seen that it is possible to distinguish in the output signal two different zones represented respectively by I and II. In the zones I, the output signal increases in amplitude with the phase-shift. In the zones II, the slope of the curve is negative, that is to say the signal decreases in amplitude when the phase-shift increases.

It is now possible to study the behaviour of the circuit when one of the component signals has a frequency, and therefore a phase, which varies rapidly in course of time about a fixed nominal value. It can be seen that the output signal (FIG. 3B) differs depending on whether the portion I or the portion II of the characteristic is concerned. If the portion I of the characteristic is concerned, that is to say the zone where the latter has a positive slope, any increment of the phase difference due to the variation of the instantaneous frequency of one of the waves results in an increment in the amplitude of the output signal and vice versa. The output signal reproduces the frequency-modulation of the input signal as positive amplitude-modulation when in zone I and as negative amplitude-modulation when in zone II.

In all the foregoing it has been implicitly assumed that the frequency difference $f_1-f_2$ was positive. In the case where this difference is negative the operation remains identically the same, but the zones I and II are reversed, that is to say the slope of the curve representing the amplitude of the output signal as a function of time is negative when the phase-shift is between $-\pi/2$ and $+\pi/2$, while it is positive when the phase-shift is between $+\pi/2$ and $+3\pi/2$.

It results from the foregoing that the sign of the amplitude modulation of the output signal from the phase-detector (when one of the signals is frequency-modulated) depends upon the sign of the difference between the two frequencies. To say that an amplitude modulation is positive signifies that the phase of the detected signal, after amplitude detection, is the same as that of the modulating signal. There is a phase-reversal of 180° between the two signals in the case of negative modulation.

In accordance with the invention provision is made to utilize the sign of the modulation of the output signal from the phase-detector 5 with respect to the phase of the modulating signal from the source 4 to characterize the sign of the difference between the frequencies to be measured. The phase comparison of the signals from 4 and 5 is made in gate 11. It is of course necessary to produce this phase comparison at preset and fixed instants during each period of the output signal from 5 at the fundamental frequency $f_1-f_2$, so as always to operate at the same place on the curve of FIG. 3B. The instants of comparison are determined by the mono-stable circuit 9.

In order that the operation of the circuit of FIG. 1 may be clearly understood, there has been shown on the curves of FIG. 4 the shape of the signals at certain points along the circuit, points referred to by the same letter references as in FIG. 1. The output signal from phase-detector 5 is shown in FIG. 3B. It is repeated at A here in order to fix the relative time-scale. There has been shown at B the signal transmitted by the low-pass filter 6. As a result of the choice of the value of the modulating frequency F, the latter is eliminated from the output signal of the low-pass filter 6 which delivers a sinusoidal signal whose frequency is equal to the absolute value of the difference between the frequencies to be measured. The curve C represents the output signal of the filter 7 tuned at the frequency F. It is constituted by the signal delivered from 4 (signal H) modulated in amplitude and in phase by the difference frequency signal $f_1-f_2$, the relative phase of the signals C and H being fixed by the sign of the difference $f_1-f_2$ as has been explained above.

It is obviously necessary to choose the value of F while taking into account the range of values of the difference $f_1-f_2$ to be measured so as to permit simple design of the filters 6 and especially 7. It is in fact necessary to make sure that the frequency F is outside the range of values of the difference to be measured. F is preferably chosen to be so difference from the maximum value attained by the difference to be measured that it is possible to utilize a relatively wide band-pass filter 7 so as to avoid the introduction of stray phase-shifts by this circuit, without having need to design it from special components which are particularly stabilized in view of possible variations in their characteristics with aging.

In a typical embodiment of the invention, the frequency $f_1$ varies between 4,500 and 5,500 cycles per sec., the frequency $f_2$ is made equal to 5,000 cycles per sec. The difference $f_1-f_2$ varies between $-500$ and $+500$ cycles. The frequency F is chosen to be 1100 cycles per sec. It is easy to design the filter 6 having a band-width of from 0 to 500 cycles per sec. in such a way that it has an attenuation pole at 1100 cycles. The signal B supplies the bi-stable circuit 8 whose output signal is shown on curve D. A slight delay $\tau$ is introduced between the square-wave D and the signal B by a suitable polarization of the circuit 8 so that the edges of the square-waves occur when the amplitude of the detected signal C is relatively large. The output pulses from generator 9 are shown at E. As has already been stated, the gate 10 is open by the short pulses given out by 9. It thus delivers to gate 11 that fraction of the signal C which is produced during the pulses E. This signal is represented at G and G′, depending on the phase of C with respect to H. The comparison between the phase of the signal G and that of the reference signal H from source 4 is effected in gates 11, the output signal of which is shown at I—I′. There have been shown at G and G′ the two types of signal given out by 10. The signal G is in phase with the auxiliary signal H and the signal G′ is in opposition of phase with auxiliary signal H. The signal I resulting from the superposition $G+H$ has a substantial amplitude. The signal I′ resulting from the superposition $G'+H$ has practically zero negative amplitude. It is recalled that the logic operations at 10 and 11 can be carried out in a single gate with three inputs.

There has been shown at J the signal obtained by derivation of square-wave D, and at K and K′ the output signals from the bi-stable circuit 12, depending on whether it receives the input signal I or I′. The signal I or I′ can be employed for any useful purpose. It is easy to shape it for direct utilization in a calculating machine or automatic control system and so on. This wave shaping is obtained in binary stage 12, the trigger threshold of which is set at a value higher than the "noise" I′ and lower than the peak signal of signal I. The initital state of the bi-stable stage 12 is fixed, before the occurrence of signal G from gate 10, by the negative pulse J obtained by deriving the rear edge of the square-wave signal D in circuit 13. When the signal I or I′ is then applied to 12 the flip-flop is triggered or not, according to its operating state preceding the pulse from 7. The output signal of binary stage 12 is represented by the curve K or K′, depending on the case. L represents the signal E differentiated in circuit 13 which clippers out the negative pip of the signal. The positive pip is fed to gate 14 which supplies the counter.

There has been shown in FIG. 5 the diagram of an oscillator used for the generation of the continuous waves at $f_1$ and $f_2$ and of the auxiliary signal at F. The values of the passive elements associated with the two transistors should be chosen with respect to the output frequency to be obtained. These oscillators of the resistor-condenser type comprise two transistors 21 and 22, PNP for example, the emitters of which have a common load 23, interconnected so that the base of one is connected to the other's collector by a condenser 24-resistor 25 network. The output S is connected to one of the collectors. The frequency modulation of the oscillator is obtained by applying to the base circuit of the two transistors, marked "Polar" in the drawing, a variable voltage supplied by a transistor whose emitter-base circuit is tuned and coupled to the source of modulating signal. The emitter of this transistor is directly coupled to the point marked "Polar" of the resistor-condenser oscillator 21—22. This type of circuit and its operation have been particularly described in the French Patent No. 1,245,754, filed by the present applicant on October 2, 1959, for: "Variable-Frequency Transistorized Multi-Vibrator."

FIG. 6 shows an embodiment of the binary stage 8. This type of circuit can also be utilized as the wave shaping circuit 12 for the difference signal. It is essentially constituted by a flip-flop of the Eccles-Jordan type, comprising two PNP transistors 31 and 32, the emitters of which have a common load resistor 33 connected to the positive terminal of the bias source. The feedback circuit connected between the collector of one of the transistors and the base of the other is constituted by a resistor shunted by a condenser.

As has already been stated above, for certain applications it is necessary to carry out the frequency or phase modulation of the wave at frequency $f_2$ once this wave has been generated. A number of methods well known in the art enable this result to be obtained. Two of these methods are being recalled, it being understood that the means employed for the frequency or the phase modulation of one of the two waves remain outside the scope of the present invention.

The first method utilizes the property of a mono-stable circuit to be triggered for a given amplitude V of the input signal (see FIG. 7). The signal at frequency $f_2$ is applied at the input in the form of a triangular signal obtained by applying the wave of frequency $f_2$ to a circuit generating triangular or saw-tooth signals. The modulation signal F is superimposed on this signal. As shown in the FIGURE 7, depending on the amplitude of F, the triggering threshold V is reached at different instants of the period of the saw-tooth signal shown at $t_1$, $t_2$ and $t_3$. There is thus obtained a phase modulation of the leading edge of the output signal. After filtering, this signal can be employed in the phase-detector.

Another well-known method consists in mixing the wave $f_2$ with a wave $f_3$ which is phase-modulated: $f_3 \pm \Delta f_3$ (where $\Delta f_3 = K \sin Ft$); the wave $f_3$ is removed by a second beating in order to obtain $$f_2 + (f_3 \pm \Delta f_3) - f_3 = f_2 \pm \Delta f_3$$

This method necessitates the use of highly selective circuits by reason of the undesirable cross modulation components which are formed at relatively close frequencies.

FIGS. 8 and 9 are concerned with the use of the method according to the invention in an automatic control system of the digital type. The device to be controlled has been shown at 41 (process). Its practical operating condition is represented by the value of a characteristic datum indicated by the measuring instrument 42 or transducer, delivering an analog signal. This signal is applied to a comparator circuit 43 which also receives a signal of the same nature, defining the reference or desired value of the said characteristic. The comparison circuit 43 delivers an error signal which is converted to a wave whose frequency $f_1$ characterizes the value (source 1 of FIG. 1). The circuit elements already shown in FIG. 1 have been given the same reference numerals. The combination of the circuits 6 to 12 is shown at 45 (frequency difference value and sign processor). This constitutes the unit in which the signals defining the sign and the value of the difference $f_1 - f_2$ are processed in the form of series of pulses. The coupling between these circuits and a reversible binary counter 46 is effected through a logic unit 49 shown in detail in FIG. 9. The output signal from counter 46 supplies the actuator 48 through a digital to analog converter 47. (In certain cases the elements 47 and 48 are a single unit).

FIG. 9 shows the detail of the logic circuit 49 of FIG. 8 operating a reversible counter known per se, for example of the type described in the article published in Electronics, dated September 25, 1959, page 82, by H. J. Weber, and entitled "Binary Circuits Count Backward or Forward." The circuit 49 controls the operation of the counter 46 in one direction or the other depending on the nature of the addition or subtraction control signal delivered by the binary stage 12 (see FIGS. 1 and 4). To simplify the description it has been assumed that counter 46 comprises three binary stages 51, 52 and 53. Under these conditions, the circuit 49 is composed of two identical units 54 and 55, of which only 54 is shown in detail, it being understood that 55 and the other circuits which could control the following binary stages of counter 46 would be identical.

Each of the circuits 54, 55, etc., ensures the interconnection between one stage of the counter 51, 52, etc., and the one following immediately 52, 53, etc. According to the output of 12 either one or the other of the outputs of the binary stage is connected to the following stage, that is to say, either the counted digit (0 or 1) or its complement (1 or 0) is added. It is known that to add the complement of a digit is equivalent to subtracting this digit.

Each circuit 54, 55 . . . comprises two "AND" gates 61 and 62, each receiving one of the signals from 12 and one of the outputs of the binary stage M or N, and an "OR" gate 63 coupling the output of the circuits 61 and 62 to the following stage of the counter. When the signal from 12 corresponds to "addition" (signal K of FIG. 4), the normal output M of the binary stage is fed to the following stage. When the signal from 12 corresponds to "subtraction," a square-wave signal similar to K but 180° out of phase, complementary output N from the binary stage is connected to the following stage.

I claim:

1. In a circuit adapted to enable the determination to be made, in a continuous manner, of the sign of a difference between two quantities represented by the frequency of two continuous waves, one said continuous wave being modulated by an auxiliary signal, means to generate waves at different frequencies and means to generate an auxiliary signal, a phase-detector circuit receiving the waves and auxiliary signal from both said means and supplying signals to two filters, one said filter being tuned at the beat frequency of said two continuous waves and the other said filter being tuned at the frequency of said auxiliary signal, two gate units of the "and" type which receive and compare the phase of the signal from the said filter which is tuned at the frequency of the auxiliary signal with the phase of the auxiliary signal, two shaping circuits which receive, as input, the output from the said beat frequency filter and shape said input into a control signal for operating said two gate units.

2. In a circuit adapted to enable the determination to be made, in a continuous manner, of the sign of a difference between to quantities represented by the frequency of two continuous waves, one said continuous wave being modulated by an auxiliary signal, means to generate waves at different frequencies and means to generate an auxiliary signal, a phase-detector circuit receiving the waves and auxiliary signal from both said means and supplying signals to two filters, one said filter being tuned at the beat frequency of said two continuous waves and the other said filter being tuned at the frequency of said auxiliary signal, two gate units of the "and" type which receive and compare the phase of the signal from the said filter which is tuned at the frequency of the auxiliary signal with the phase of the auxiliary signal, two shaping circuits which receive, as input, the output from said beat frequency filter and shape said input into a control signal fed to said two gate units, said two shaping circuits comprising a bi-stable circuit followed by a mono-stable circuit.

3. In a circuit adapted to enable the determination to be made, in a continuous manner, of the sign of a difference between two quantities represented by the frequency of two continuous waves, one said continuous wave being modulated by an auxiliary signal, means to generate waves at different frequencies and means to generate an auxiliary signal, a phase-detector circuit receiving the waves and auxiliary signal from both said means and supplying signals to two filters, one said filter being tuned at the beat frequency of said two continuous waves and the other said filter being tuned at the frequency of said auxiliary signal, two gate units of the "and" type which receive and compare the phase of the signal from the said filter which is tuned at the frequency of the auxiliary signal with the phase of the auxiliary signal, two shaping circuits which receive, as input, the output from said beat frequency filter and shape said input into a control signal for operating said two gate units, said two shaping circuits comprising a bi-stable circuit followed by a mono-stable circuit, said mono-stable circuit triggered by said bi-stable circuit after a fixed delay.

4. In a circuit adapted to enable the determination to be made, in a continuous manner, of the sign of a difference between two quantities represented by the frequency of two continuous waves, one said continuous wave being modulated by an auxiliary signal, means to generate waves at different frequencies and means to generate an auxiliary signal, a phase-detector circuit receiving the waves and auxiliary signal from both said means and supplying signals to two filters, one said filter being tuned at the beat frequency of said two continuous waves and the other said filter being tuned at the frequency of said auxiliary signal, a phase-comparison circuit incorporating a double input gate unit of the "and" type to receive and compare the phase of the signal from the said filter which is tuned at the frequency of the auxiliary signal with the phase of the auxiliary signal, two shaping circuits which receive, as input, the output from said beat frequency filter and shape said input into a control signal for operating said phase-comparison circuit.

5. In a circuit adapted to enable the determination to be made, in a continuous manner, of the sign of a difference between two quantities represented by the frequency of two continuous waves, one said continuous wave being modulated by an auxiliary signal, means to generate waves at different frequencies and means to generate an auxiliary signal, a phase-detector circuit receiving the waves and auxiliary signal from both said means and supplying signals to two filters, one said filter being tuned at the beat frequency of said two continuous waves and the other said filter being tuned at the frequency of said auxiliary signal, a phase-comparison circuit incorporating a double input gate unit of the "and" type which receives and compares the phase of the signal from the said filter which is tuned at the frequency of the auxiliary signal with the phase of the auxiliary signal, two shaping circuits which receive, as input, the output from said beat frequency filter and shape said input into a control signal for operating said phase-comparison circuit, said two shaping circuits comprising firstly a bi-stable circuit followed by a mono-stable circuit.

6. In a circuit adapted to enable the determination to be made, in a continuous manner, of the sign of a difference between two quantities represented by the frequency of two continuous waves, one said continuous wave being modulated by an auxiliary signal, means to generate waves at different frequencies and means to generate an auxiliary signal, a phase-detector circuit receiving the waves and auxiliary signal from both said means and supplying signals to two filters, one said filter being tuned at the beat frequency of said two continuous waves and the other said filter being tuned at the frequency of said auxiliary signal, a phase-comparison circuit incorporating a double input gate unit of the "and" type which receives and compares the phase of the signal from the said filter which is tuned at the frequency of the auxiliary signal with the phase of the auxiliary signal, two shaping circuits which receive, as input, the output from said beat frequency filter and shape said input into a control signal for operating said phase-comparison circuit, said two shaping circuits comprising firstly a bi-stable circuit followed by a mono-stable circuit, said mono-stable circuit being adapted to be triggered by said bi-stable circuit after a fixed delay.

7. In combination in a circuit adapted to enable the determination to be made, in a continuous manner, of the sign of a difference between two quantities represented by the frequency of two continuous waves, one said continuous wave being modulated by an auxiliary signal, means to generate waves at different frequencies and means to generate an auxiliary signal, a phase-detector circuit receiving the waves and auxiliary signal from both said means and supplying signals to two filters, one said filter being tuned at the beat frequency of said two continuous waves and the other said filter being tuned at the frequency of said auxiliary signal, two gate units of the "and" type which receive and compare the phase of the signal from the said filter which is tuned at the frequency of the auxiliary signal with the phase of the auxiliary signal, two shaping circuits which receive, as input, the output from said beat frequency filter and shape said input into a control signal for operating said two gate units, a bi-stable binary circuit which is triggered by the output from said two gate units, and a reverse binary counter controlled by the output of said bi-stable binary circuit and operated by the output of said shaping circuits.

8. Zero-error automatic control means, including means to generate waves at different frequencies and means to generate an auxiliary signal, a phase-detector circuit receiving the waves and auxiliary signal from both said means and supplying signals to two filters, one said filter being tuned at the beat frequency of two continuous waves, one of said continuous waves being modulated by an auxiliary signal, and the other said filter being tuned at the frequency of said auxiliary signal, two gate units of the "and" type which receive and compare the phase of the signal from the said filter which is tuned at the frequency of the auxiliary signal with the phase of the auxiliary signal, two shaping circuits which receive, as input, the output from said beat frequency filter and to shape said input into a control signal for operating said two gate units.

9. Zero-error automatic control means, including means to generate waves at different frequencies and means to generate an auxiliary signal, a phase-detector circuit receiving the waves and auxiliary signal from both said means and supplying signal to two filters, one said filter being tuned at the beat frequency of two continuous waves, one of said continuous waves being modulated by an auxiliary signal, and the other said filter being tuned at the frequency of said auxiliary signal, a phase-comparison circuit incorporating a double input gate unit of the "and" type which receives and compares the phase of the signal from the said filter which is tuned at the frequency of the auxiliary signal with the phase of the auxiliary signal, two shaping circuits which receive, as input, the output from said beat frequency filter and shape said input into a control signal for operating said phase-comparison circuit.

References Cited in the file of this patent

UNITED STATES PATENTS 2,858,425 Gordon ---------------- Oct. 28, 1958